(12) United States Patent
Kim

(10) Patent No.: US 8,775,240 B2
(45) Date of Patent: Jul. 8, 2014

(54) COMPUTER-IMPLEMENTED METHOD AND COMPUTING SYSTEM FOR PROVIDING ADVERTISEMENT CONTENT, AND COMPUTER-IMPLEMENTED METHOD AND COMPUTING SYSTEM FOR EXPOSING ADVERTISEMENT CONTENT

(75) Inventor: Byounghak Kim, Seoul (KR)

(73) Assignee: NHN Business Platform Corporation (KR)

( * ) Notice: Subject to any disclaimer, the term of this patent is extended or adjusted under 35 U.S.C. 154(b) by 906 days.

(21) Appl. No.: 12/466,455

(22) Filed: May 15, 2009

(65) Prior Publication Data

US 2009/0287554 A1 Nov. 19, 2009

(30) Foreign Application Priority Data

May 16, 2008 (KR) .................. 10-2008-0045450

(51) Int. Cl.
- *G06Q 30/00* (2012.01)
- *G06Q 30/06* (2012.01)
- *G06Q 30/02* (2012.01)
- *G06Q 40/00* (2012.01)

(52) U.S. Cl.
CPC ............ *G06Q 30/02* (2013.01); *G06Q 30/0601* (2013.01); *G06Q 30/0283* (2013.01); *G06Q 40/12* (2013.01); *G06Q 30/0212* (2013.01); *G06Q 30/0201* (2013.01)
USPC ........................................................ 705/14.1

(58) Field of Classification Search
CPC ...................................................... G06Q 90/00
USPC ........................................................ 705/14.1
See application file for complete search history.

(56) References Cited

U.S. PATENT DOCUMENTS

| 2008/0082400 A1* | 4/2008 | Martel et al. ..................... 705/10 |
| 2009/0006191 A1* | 1/2009 | Arankalle et al. .............. 705/14 |

* cited by examiner

*Primary Examiner* — Daniel Lastra
(74) *Attorney, Agent, or Firm* — Harness, Dickey & Pierce, PLC

(57) ABSTRACT

A computer-implemented method and computing system for providing advertisement content and a computer-implemented method and computing system for exposing advertisement content are provided. A computer-implemented method of providing advertisement content, the method includes: receiving a bid request with respect to the advertisement content associated with digital broadcast content; determining an exposure ranking of the advertisement content using quality information of the advertisement content; and providing the digital broadcast content and the advertisement content arranged based on the exposure ranking, wherein the advertisement content is classified by an accounting method.

29 Claims, 8 Drawing Sheets

FIG. 4

| DIGITAL BROADCAST CONTENT |||||||||
|---|---|---|---|---|---|---|---|---|
| CPC(COST PER CLICK) |||||CPM(COST PER MILLE) ||||
| ADVERTISEMENT | MAXIMUM CLICK COST | QI | RANKING INDEX | CTR | ADVERTISEMENT | SET COST | CTR ||
| ADVERTISEMENT a | 100 | 8 | 800 | 25% | ADVERTISEMENT 1 | 700 | 20% ||
| ADVERTISEMENT b | 150 | 6 | 900 | 15% | ADVERTISEMENT 2 | 900 | 17% ||
| ADVERTISEMENT c | 100 | 5 | 500 | 10% | ADVERTISEMENT 3 | 1000 | 15% ||
| ADVERTISEMENT d | 200 | 3 | 600 | 5% | ADVERTISEMENT 4 | 800 | 14% ||
| ... ||||| ... ||||

COMPUTER-IMPLEMENTED METHOD AND COMPUTING SYSTEM FOR PROVIDING ADVERTISEMENT CONTENT, AND COMPUTER-IMPLEMENTED METHOD AND COMPUTING SYSTEM FOR EXPOSING ADVERTISEMENT CONTENT

CROSS-REFERENCE TO RELATED APPLICATION

This application claims the benefit of Korean Patent Application No. 10-2008-0045450, filed on May 16, 2008, in the Korean Intellectual Property Office, the disclosure of which is incorporated herein by reference.

BACKGROUND OF THE INVENTION

1. Field of the Invention

The present invention relates to a computer-implemented method and computing system for providing advertisement content, and a computer-implemented method and computing system for exposing advertisement content. More particularly, the present invention relates to a computer-implemented method and computing system for providing advertisement content, and a computer-implemented method and computing system for exposing advertisement content which may bid on advertisement content associated with digital broadcast content, and expose the advertisement content in an exposure region based on an accounting method of the advertisement content.

2. Description of Related Art

Currently, the combination of broadcasting and advertising has been attempted based on the development of broadcast media technologies. In particular, an interactive broadcasting between viewers and digital broadcasting service providers is available due to the spread of digital broadcasting. As an Internet Protocol Television (IPTV) service that may provide an interactive service between viewers and digital broadcasting service providers through the Internet is currently the focus of attention, attempts to combine broadcasting and advertising using the interactive characteristics have increased.

When broadcasting and advertising are combined, a method where an advertiser efficiently provides viewers with an advertisement through a digital broadcasting service and a method where a digital broadcasting service provider efficiently obtains a commission on an advertisement of an advertiser are required.

For example, when a viewer of a digital broadcast is interested in a product visible in a particular scene, it is common that the viewer purchases the product by obtaining information about the product. In particular, when digital broadcast content such as a soap opera, a movie, and the like is popular with viewers, the example described above may happen more often.

Accordingly, the number of advertisers that desire to advertise products in scenes of the digital broadcast content may increase. However, a specific method of efficiently providing an advertisement to viewers has yet to be provided.

In addition, when a digital broadcasting service provider provides a brokerage service for an advertiser that desires to provide viewers with an advertisement through digital broadcasting, a specific method of obtaining a commission on the advertisement has also been yet to be provided.

BRIEF SUMMARY OF INVENTION

According to an aspect of the present invention, there is provided a computer-implemented method of providing advertisement content, the method including the steps of: receiving a bid request with respect to the advertisement content associated with digital broadcast content; determining an exposure ranking of the advertisement content using quality information of the advertisement content; and providing the digital broadcast content and the advertisement content arranged based on the exposure ranking, wherein the advertisement content is classified by an accounting method.

According to an aspect of the present invention, there is provided a computer-implemented method of exposing advertisement content, the method including the steps of: receiving digital broadcast content and the advertisement content arranged based on an exposure ranking; setting an exposure region of the advertisement content on a display scene of the digital broadcast content based on an accounting method of the advertisement content; and exposing the advertisement content on the exposure region at a playback time of the digital broadcast content.

According to an aspect of the present invention, there is provided a computing system for providing advertisement content, including: a bid request receiving component configured to receive a bid request with respect to the advertisement content associated with digital broadcast content; an exposure ranking determination component configured to determine an exposure ranking of the advertisement content using quality information of the advertisement content; and a content providing component configured to provide the digital broadcast content and the advertisement content arranged based on the exposure ranking, wherein the advertisement content is classified by an accounting method.

According to an aspect of the present invention, there is provided a computing system for exposing advertisement content, including: a content receiving component configured to receive digital broadcast content and the advertisement content arranged based on an exposure ranking; an exposure region setting component configured to set an exposure region of the advertisement content on a display scene of the digital broadcast content based on an accounting method of the advertisement content; and an advertisement content exposure component configured to expose the advertisement content on the exposure region at a playback time of the digital broadcast content.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 4 is a diagram illustrating an example of determining an exposure ranking of advertisement content associated with digital broadcast content according to an embodiment of the invention;

DETAILED DESCRIPTION OF THE INVENTION

Figure 1:
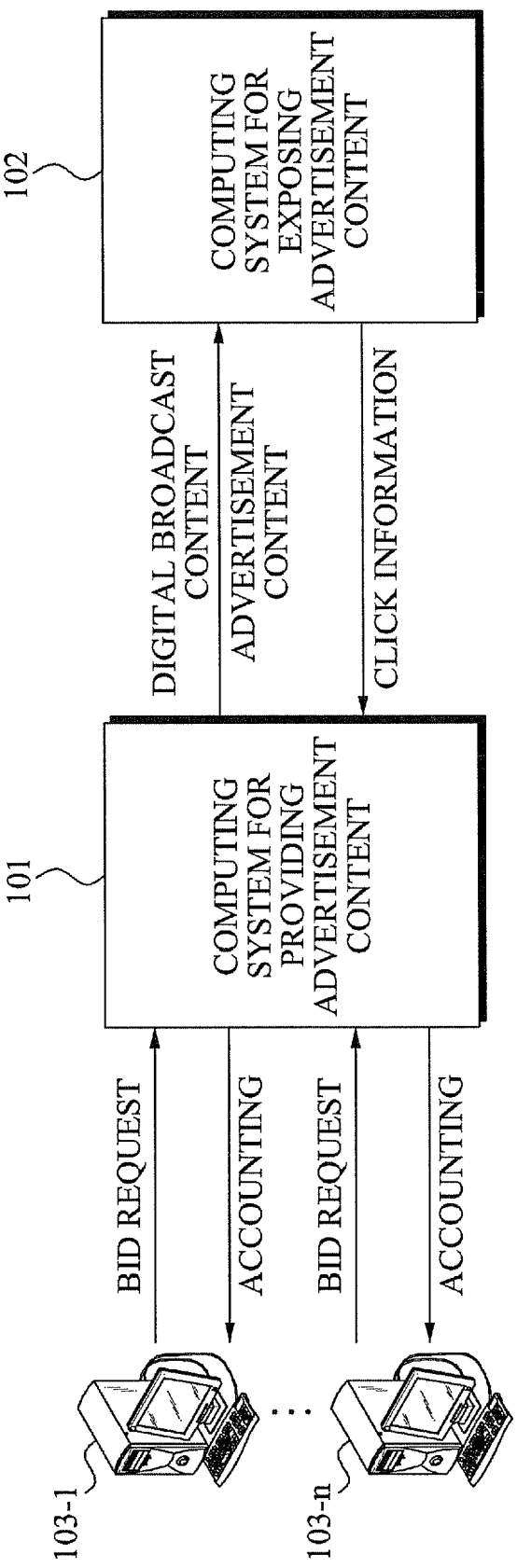
FIG. 1 is a diagram illustrating a process for providing and exposing advertisement content according to an embodiment of the invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures. A computer-implemented method of providing advertisement content may be performed by a computing system for providing advertisement content according to an embodiment of the invention. A computer-implemented method of exposing advertisement content may be performed by a computing system for exposing advertisement content according to an embodiment of the invention.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which computing systems (and computer-implemented methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

FIG. 1 is a diagram illustrating a process for providing and exposing advertisement content according to an embodiment of the invention.

Digital broadcasting may include cable broadcasting, satellite broadcasting, Internet Protocol Television (IPTV) broadcasting, and the like. According to an exemplary embodiment of the invention, however, a computer-implemented method and computing system for providing advertisement content and a computer-implemented method and computing system for exposing advertisement content may be applied to the IPTV broadcasting.

The computing system 101 for providing advertisement content, hereinafter, referred to as 'advertisement content providing system,' may include a server to provide digital broadcast content. The digital broadcast content may be provided by a digital broadcasting service provider that provides a digital broadcasting service. Also, the computing system 102 for exposing advertisement content, hereinafter, referred to as 'advertisement content exposing system,' may include a broadcast receiving terminal that receives and replays a digital broadcast such as a TV including a set-top box.

Referring to FIG. 1, the advertisement content providing system 101 may receive a bid request with respect to the advertisement content from advertisers 103-1 through 103-n. In this instance, the bid request may be associated with advertisement content associated with the digital broadcast content provided by the advertisement content providing system 101. For example, the advertisement content may indicate an advertisement associated with a particular scene of the digital broadcast content. Here, a number of advertisement contents may be at least one.

For example, the advertisement content providing system 101 may determine an exposure ranking of the advertisement content. The exposure ranking may be determined by an accounting method of the advertisement content. In this instance, the accounting method of the advertisement content may include a Cost Per Click (CPC) method, Cost Per Mille (CPM) method, and the like.

In CPC, an advertisement cost may be paid only when a viewer watching digital broadcast content clicks regardless of a number of times that the advertisement content is exposed. That is, when the viewer visits a webpage connected to the advertisement content by clicking the advertisement content, a cost per click may be deducted from a predetermined amount of money set by an advertiser.

In CPM, a predetermined fixed amount of money may be imposed with respect to advertisement content, exposed during a predetermined period, regardless of a viewer's click. According to an embodiment of the invention, the CPC method and CPM method may be applied to the digital broadcasting, the digital broadcasting service provider may obtain a commission on the advertisement content.

The advertisement content providing system 101 may provide the digital broadcast content and the advertisement content arranged based on the exposure ranking to the advertisement content exposing system 102. That is, when the digital broadcasting service provider broadcasts a digital broadcast to viewers, the advertisement content, the advertisement content being arranged based on the exposure ranking, may be transmitted together with the digital broadcast For example, the advertisement content exposing system 102 may replay the digital broadcast content using an application such as an Electronic Program Guide (EPG) or an Interactive Program Guide (IPG). In this instance, the advertisement content exposing system 102 may expose the advertisement content on an exposure region at a playback time of the digital broadcast content. The exposure region may be set differently depending on the accounting method of the advertisement content. In this instance, the exposure region may indicate a portion of a display scene of the digital broadcast content.

When the viewer watching the digital broadcast content clicks the exposed advertisement content, for example, when the viewer selects the advertisement content through a remote control, the advertisement content exposing system 102 may transmit click information of the advertisement content to the advertisement content providing system 101. Accordingly, the advertisement content providing system 101 may impose a fee on the advertisers 103-1 through 103-n based on the click information of the advertisement content.

Therefore, the advertisement content providing system 101 may receive the bid request with respect to the advertisement content, associated with the digital broadcast content, from the advertisers 103-1 through 103-n, and thereby may determine the exposure ranking. Also, the advertisement content exposing system 102 may expose the digital broadcast content and the arranged advertisement content, provided by the advertisement content providing system 101, at the playback time of the digital broadcast content, based on the accounting method. Accordingly, an advertising effect may be improved.

Also, the advertisement content exposing system 102 may collect the click information of the advertisement content and provide the click information to the advertisement content providing system 101. The advertisement content providing system 101 may impose the cost to the advertisers 103-1 through 103-n based on the click information. Accordingly, the commission on the advertisement content may be obtained.

Figure 2:
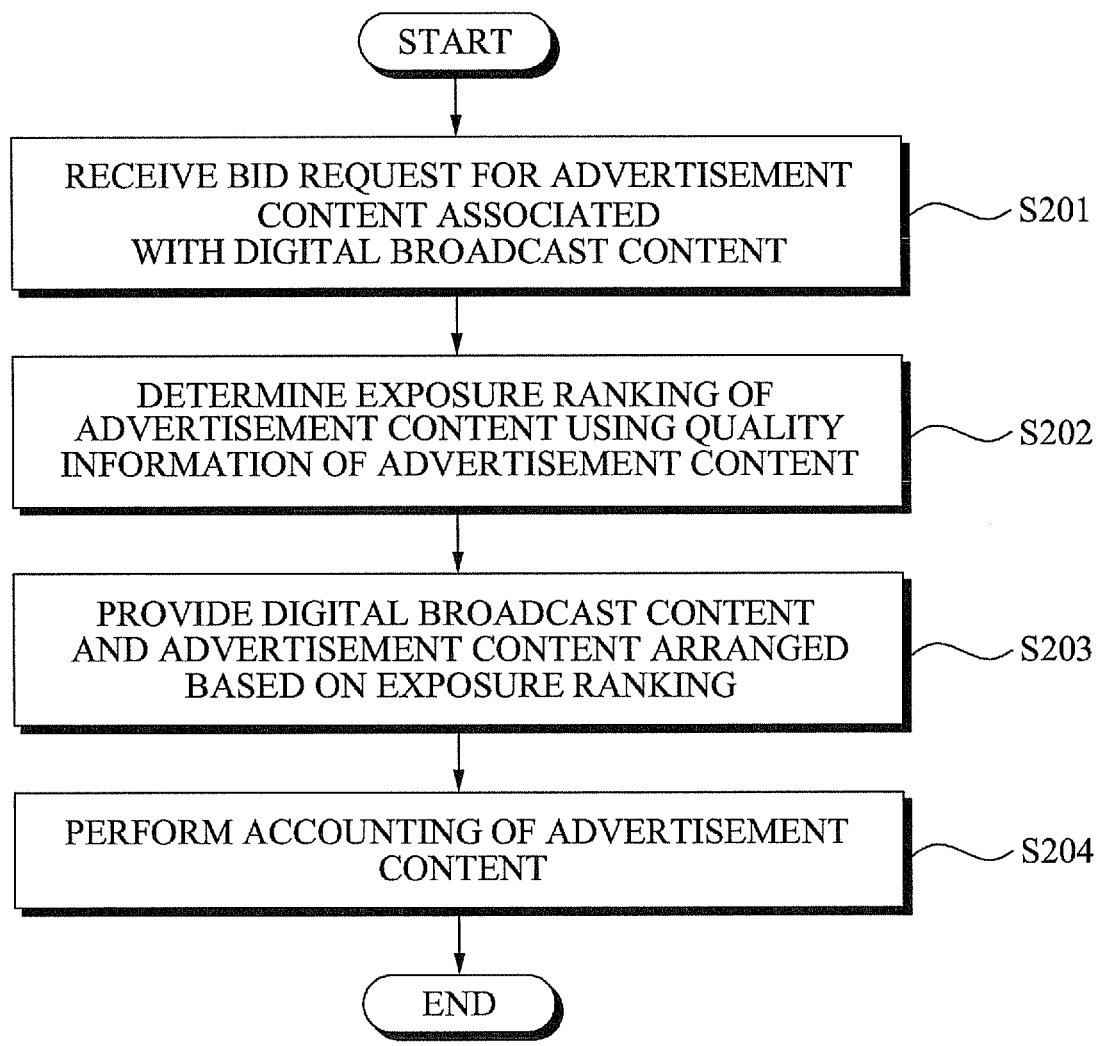
FIG. 2 is a flowchart illustrating a computer-implemented method of providing advertisement content according to an embodiment of the invention.

FIG. 2 is a flowchart illustrating a computer-implemented method of providing advertisement content according to an embodiment of the invention.

In operation S201, the computer-implemented method of providing advertisement content, hereinafter, referred to as 'advertisement content providing method,' may receive a bid request with respect to the advertisement content associated with digital broadcast content.

In this instance, the advertisement content may be at least one, and be classified by an accounting method. For example, the accounting method may include a CPC method and a CPM method.

For example, in operation S201, the bid request with respect to the advertisement content may be received for each scene of the digital broadcast content. The digital broadcast content may include a plurality of scenes. In this instance, in operation S201, the bid request with respect to the advertisement content may be received for each of the plurality of scenes of the digital broadcast content.

For example, when the digital broadcast content is a soap opera, and when a necklace or a suit that a character in the soap opera is wearing is visible in a particular scene of the soap opera, a viewer interested in the necklace or the suit may exist. An advertiser that sells the necklace, the suit, or related products may bid on advertisement content of the advertiser with respect to the particular scene.

The number of scenes of the digital broadcast content may not be limited. However, in operation S201, the bid request may be received for each scene where at least one product may be noticeably exposed. Also, a number of advertisement contents which may be bidden on with respect to each scene may not be limited.

For example, in operation S201, the bid request with respect to the advertisement content may be received for each predetermined advertising time during a playback time of the digital broadcast content.

For example, with respect to a particular scene where advertisement content is in high demand, the bid request with respect to the advertisement content may be received from when the particular scene starts replaying to when a maximum advertising effect may be obtained. In this instance, a time of the advertisement content may not be limited.

Accordingly, the advertiser may determine whether the bid request is made for each scene for a temporary advertising effect or for each predetermined advertising time for a relatively long-term advertising effect.

In operation S202, the advertisement content providing method may determine an exposure ranking of the advertisement content using quality information of the advertisement content.

For example, two methods of determining the exposure ranking of the advertisement content using the quality information of the advertisement content are provided.

First, in operation S202, a Click-Through Rate (CTR) may be arranged in a descending order. The exposure ranking may be determined in the arranged order. The CTR may be the quality information of the advertisement content, and be applied regardless of the accounting method of the advertisement content. In this instance, the CTR may indicate a number of clicks with respect to a number of exposures of the advertisement content. That is, the CTR may be post-evaluation information in that the CTR may be measured on a premise that the advertisement content has been exposed.

Second, in operation S202, the exposure ranking may be determined based on the accounting method of the advertisement content. In this instance, the accounting method may include the CPC method and the CPM method.

In operation S202, when the accounting method of the advertisement content is the CPC method, the exposure ranking may be determined based on a maximum click cost and a ranking index. The maximum click cost may be included in the bid request, and the ranking index may be based on a quality index which is quality information of the advertisement content.

Also, the quality index may be calculated by applying a weight to each of a quality element of the advertisement content and the CTR of the advertisement content. Here, the quality element may be a pre-evaluation, and the CTR may be a post-evaluation. Also, the quality element may include a popularity of the digital broadcast content or a Title & Description (T&D) of the advertisement content.

Since a difference in the quality index may be significant depending on the advertisement content, the advertisement content providing system 101 may determine the exposure ranking of the advertisement content using a modified quality index.

For example, the quality index may be modified based on a maximum quality index and a minimum quality index of the advertisement content. For example, when the maximum quality index is greater than a predetermined multiple of the minimum quality index with respect to the quality index of the advertisement content, every quality index of the advertisement content may be modified to be equal to or less than the multiple based on the minimum quality index.

Also, the quality index may be modified based on an average value of a quality index of the advertisement content during a predetermined period. For example, a daily quality index may be calculated by extracting a quality element and a CTR with respect to an advertisement for 10 days, and a quality index of the advertisement may be modified based on an average value of the daily quality indexes.

Similarly, when an interest in the advertisement content rapidly increases within a particular period, the CTR may also abnormally increase. Accordingly, the advertisement content providing system 101 may determine the exposure ranking of the advertisement content using a modified CTR.

For example, the CTR may be modified based on an average CTR during a predetermined period for each exposure ranking of the advertisement content. In this instance, a CTR which is significantly different from the average CTR may be removed as an outlier. Also, the CTR may be modified based on an average CTR during a predetermined period.

Also, in operation S202, when the accounting method of the advertisement content is the CPM method, the exposure ranking may be determined based on the CTR of the advertisement content.

In operation S203, the advertisement content providing method may provide the digital broadcast content and the advertisement content arranged based on the exposure ranking. That is, an operation of providing the digital broadcast content and the advertisement content may indicate that a digital broadcast and an advertisement, associated with the digital broadcast, are transmitted by a digital broadcasting service provider to a terminal receiving the digital broadcast.

In operation S204, the advertisement content providing method may receive click information of the advertisement content and perform accounting of the advertisement content based on the accounting method of the advertisement content.

As illustrated in FIG. 1, when the advertisement content providing system 101 provides the digital broadcast content and the advertisement content to an advertisement content exposing system 102, the advertisement content exposing system 102 may expose the advertisement content while the digital broadcast content is being replayed. When a number of viewers click the advertisement content, the advertisement content exposing system 102 may collect and transmit the click information to the advertisement content providing system 101.

Accordingly, the advertisement content providing system 101 may perform accounting of the advertisement content based on the accounting method of the advertisement content, using the click information including the number of clicks of the viewers. However, when the accounting method is the CPM method, the accounting may be performed regardless of the number of clicks.

Figure 3:
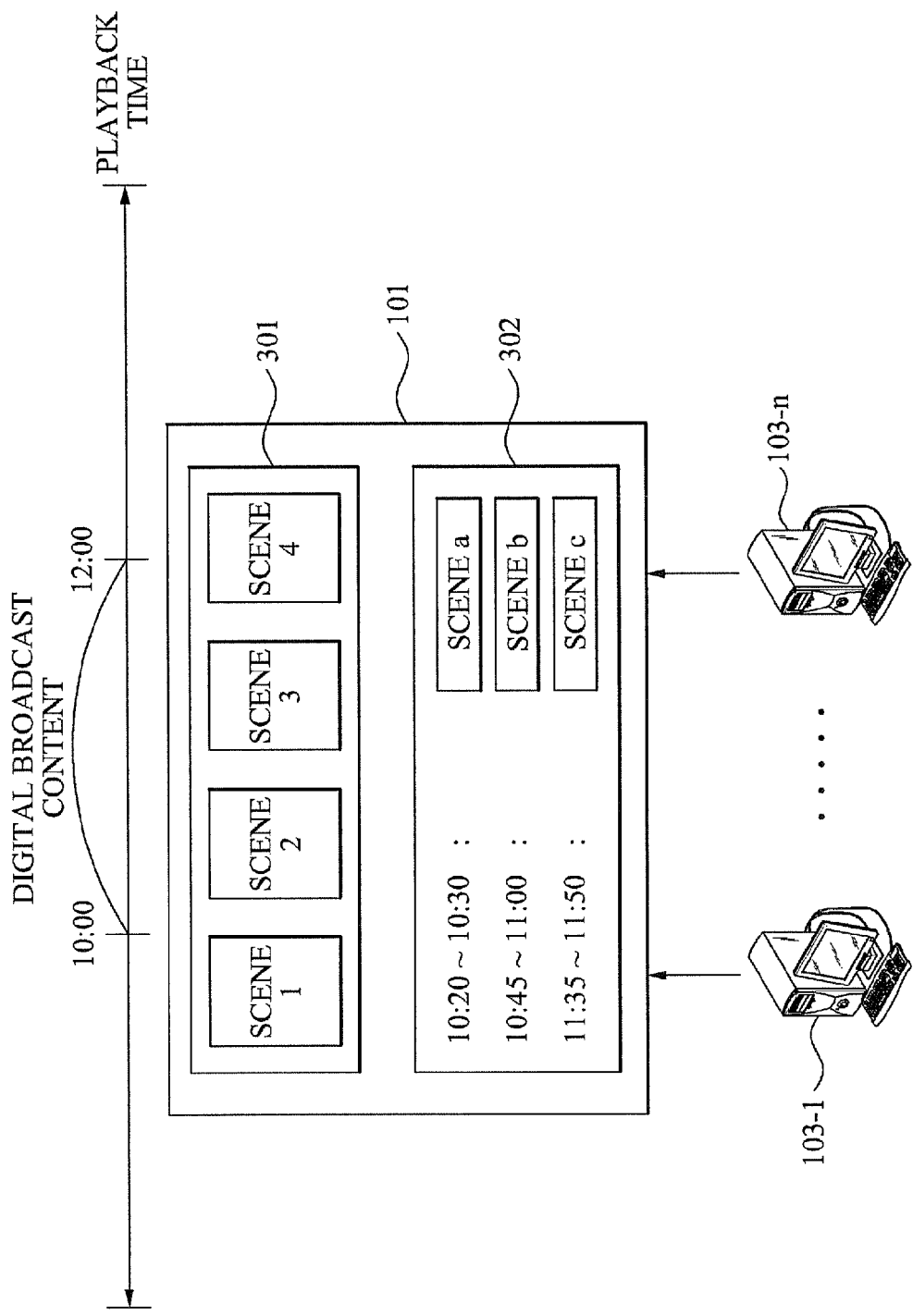
FIG. 3 is a diagram illustrating an example of receiving a bid request with respect to advertisement content associated with digital broadcast content according to an embodiment of the invention.

FIG. 3 is a diagram illustrating an example of receiving a bid request with respect to advertisement content associated with digital broadcast content according to an embodiment of the invention.

Referring to FIG. 3, the advertisement content providing system 101 may receive a first bid request 301 for the advertisement content for each scene of the digital broadcast content, from advertisers 103-1 through 103-n.

When the digital broadcast content includes a first scene, a second scene, a third scene, and a fourth scene, the advertisers 103-1 through 103-n may bid on advertisement content associated with each of the first scene, the second scene, the third scene, and the fourth scene, with respect to the advertisement content providing system 101. In this instance, a number of scenes may not be limited and may vary. Also, an interval between scenes may not be limited.

Also, referring to FIG. 3, the advertisement content providing system 101 may receive a second bid request 302 for the advertisement content for each predetermined advertising time during a playback time of the digital broadcast content, from the advertisers 103-1 through 103-n.

For example, when a scene a, a scene b, and a scene c of the digital broadcast content are displayed at 10:20, 10:45, and 11:35, respectively, during a playback time of the digital broadcast content from 10:00 to 12:00, a digital broadcasting service provider may set an advertising time for each of the scenes based on a time which maintains an advertising effect of a corresponding scene.

Accordingly, the advertisers 103-1 through 103-n may select a desired advertising time and transmit the second bid request 302 to the advertisement content providing system 101. The advertising time may be set differently depending on a playback time of the digital broadcast content or a characteristic of a scene.

According to an embodiment of the invention, although the bid request with respect to each scene and the bid request with respect to each predetermined advertising time are provided, the bid request may not be limited to the above-described exemplary embodiment.

FIG. 4 is a diagram illustrating an example of determining an exposure ranking of advertisement content according to an embodiment of the invention.

Referring to FIG. 4, a list of advertisement contents where a bid request is received with respect to digital broadcast content is illustrated. The advertisement contents may be classified by an accounting method of the advertisement content. As described above, according to an embodiment of the invention, two methods of determining the exposure ranking of the advertisement content may be provided.

First, the exposure ranking may be determined using a CTR regardless of the accounting method. Accordingly, an exposure ranking of advertisement content based on a CPC method may be determined in an order of an advertisement a, an advertisement b, an advertisement c, and an advertisement d. Also, an exposure ranking of advertisement content based on a CPM method may be determined in an order of a first advertisement, a second advertisement, a third advertisement, and a fourth advertisement.

Second, the exposure ranking may be determined based on the accounting method of the advertisement content. In this instance, an exposure ranking of advertisement content based on a CPC method may be determined based on a ranking index. The ranking index may be calculated by multiplying a quality index with a maximum click cost. Also, an exposure ranking of advertisement content based on a CPM method may be determined using a CTR.

Accordingly, the exposure ranking of advertisement content based on the CPC method may be determined in an order of the advertisement b, the advertisement a, the advertisement d, and the advertisement c. Also, the exposure ranking of advertisement content based on the CPM method may be determined in the order of the first advertisement, the second advertisement, the third advertisement, and the fourth advertisement, which is the same as the first method.

Detailed descriptions of the CPC method, the CPM method, the CTR, and the quality index have been described above with reference to FIG. 2.

Figure 5:
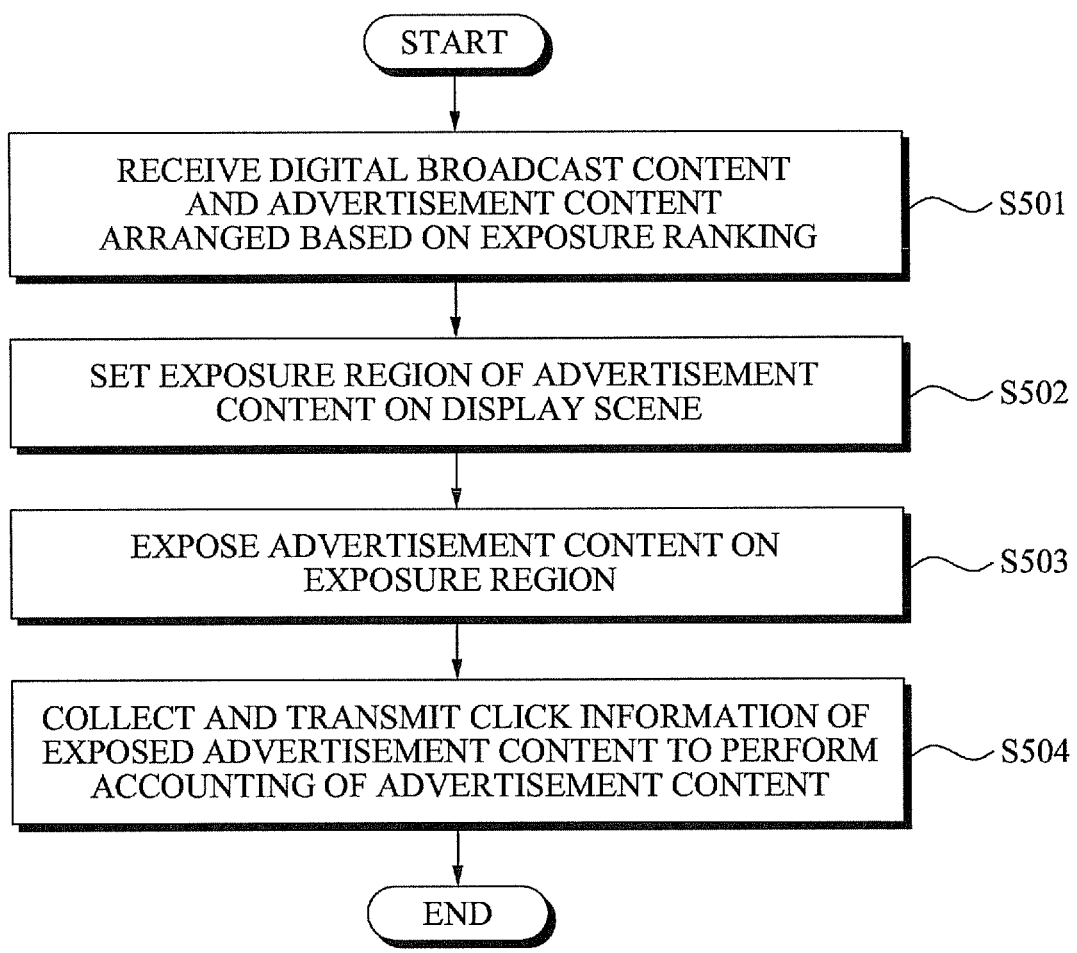
FIG. 5 is a flowchart illustrating a computer-implemented method of exposing advertisement content according to an embodiment of the invention.

FIG. 5 is a flowchart illustrating a computer-implemented method of exposing advertisement content according to an embodiment of the invention.

In operation S501, the computer-implemented method of exposing advertisement content, hereinafter, referred to as 'advertisement content exposing method,' may receive digital broadcast content and the advertisement content arranged based on an exposure ranking.

In this instance, the advertisement content may be bidden on with respect to each scene of the digital broadcast content. Also, the advertisement content may be bidden on with respect to each predetermined advertising time during a playback time of the digital broadcast content.

For example, the exposure ranking may be determined based on a CTR. The CTR may be quality information of the advertisement content. In this instance, the advertisement content may be determined in an order of highest CTR regardless of the accounting method.

For example, the exposure ranking may be determined differently depending on the accounting method. When the accounting method of the advertisement content is a CPC method, the exposure ranking may be determined based on a maximum click cost and a ranking index. The maximum click cost may be included in the bid request, and the ranking index may be based on a quality index which is quality information of the advertisement content. When the accounting method of the advertisement content is a CPM method, the exposure ranking may be determined based on a CTR of the advertisement content.

In operation S502, the advertisement content exposing method may set an exposure region of the advertisement content on a display scene of the digital broadcast content based on the accounting method of the advertisement content.

In operation S502, the exposure region on the display scene may be set differently depending on the accounting method of the advertisement content.

For example, when the CPC method is used, the exposure region may be set in a top portion or a bottom portion of the display scene of the digital broadcast content. In this instance, since an advertisement title and description may be included in the advertisement content, the exposure region is required to be large. Also, the advertisement content based on the CPC method may be displayed as a list, the advertisement content may be set in the bottom portion of the display scene of the digital broadcast content.

Also, when the CPM method is used, the exposure region may be set in a left portion or a right portion of the display scene of the digital broadcast content. In this instance, since the advertisement content based on the CPM method is generally displayed as a banner in an image form, the exposure region may be smaller than the exposure region when the CPC method is used.

However, a setting type of the exposure region may not be limited to the above-described types. The exposure region may be freely set on the display scene of the digital broadcast content.

In operation S503, the advertisement content exposing method may expose the advertisement content on the exposure region at a playback time of the digital broadcast content.

In operation S503, when the advertisement content is bidden on with respect to each scene of the digital broadcast content, the advertisement content exposing method may expose the advertisement content while the digital broadcast content is being replayed. That is, the advertisement content may be exposed for a relatively short time from when scenes where the bid request is received starts to when the scenes ends.

Also, when the advertisement content is bidden on with respect to each predetermined advertising time during the playback time of the digital broadcast content, the advertisement content exposing method may expose the advertisement content during the advertising time. That is, the advertisement content may be exposed for a relatively long time from when the advertising time starts to when the advertising time ends.

In operation S504, the advertisement content exposing method may collect and transmit click information of the exposed advertisement content to perform accounting of the advertisement content.

When a viewer of the digital broadcast content selects the exposed advertisement content by clicking, the advertisement content exposing system 102 may collect the click information of the exposed advertisement content, and transmit the click information to the advertisement content providing system 101 to perform accounting of the advertisement content.

In this instance, the click information may be a number of clicks with respect to the advertisement content based on the CPC method as opposed to the advertisement content based on the CPM method which is managed based on a flat sum payment. The CPC method may be affected by the number of clicks. That is, the click information associated with selecting exposed advertisement content on a display where a digital broadcast is being replayed using a remote control or through a touch screen.

Figure 6:
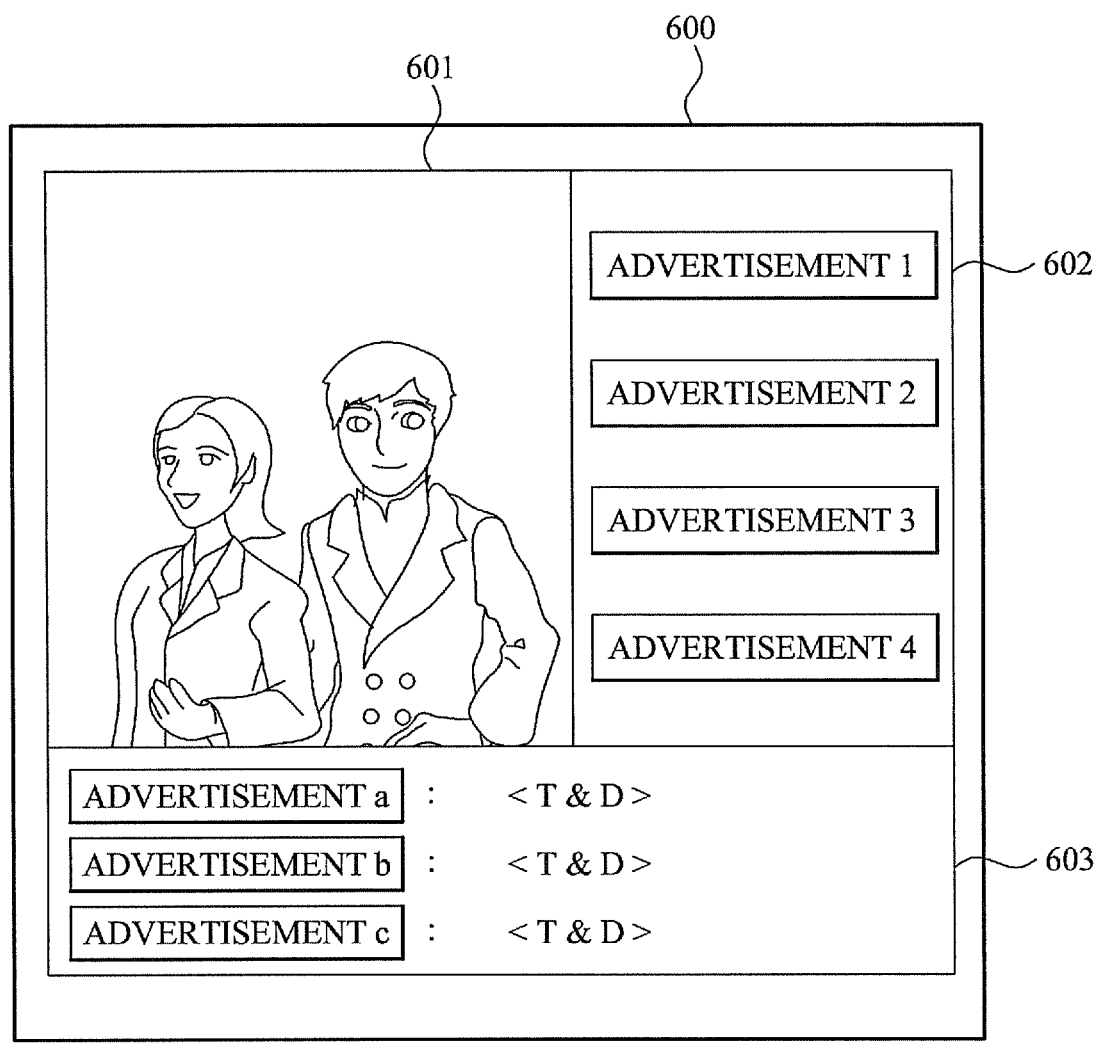
FIG. 6 is a diagram illustrating an example of exposing advertisement content on a display scene of digital broadcast content according to an embodiment of the invention.

FIG. 6 is a diagram illustrating an example of exposing advertisement content on a display scene of digital broadcast content according to an embodiment of the invention.

Referring to FIG. 6, a display scene 601 of the digital broadcast content is shown on a display 600. Also, an exposure region 602 based on a CPM method may be set to the right of the display area 601, and an exposure region 603 based on a CPC method may be set below the display scene 601.

For example, an advertisement content providing system 101 may receive a bid request with respect to clothes that a man is wearing on the display scene 601, from a plurality of advertisers. In this instance, the advertisement content may be classified by an accounting method, and the accounting method may be the CPC method or the CPM method.

The advertisement content providing system 101 may determine an exposure ranking of the advertisement content where the bid request is received, and provide an advertisement content exposing system 102 with the digital broadcast content and the advertisement content arranged based on the exposure ranking.

The advertisement content exposing system 102 may set an exposure region of the advertisement content based on the accounting method of the advertisement content. The advertisement content based on the CPC method may be displayed as a list. The advertisement content based on the CPC method may include a T&D of the advertisement content. An exposure region 603 of the advertisement content based on the CPC method may be located below the display scene 601. In this instance, the exposure region 603 may be in a list form.

Also, advertisement content based on the CPM method may be displayed as a banner. The advertisement content based on the CPM method may include a background and characters. An exposure region 602 based on the CPM method may be located to the right of the display scene 601.

In this instance, the advertisement content based on the CPC method or the advertisement content based on the CPM method may be arranged and exposed based on an exposure ranking. However, when a number of inventories of an exposure region is less than a number of advertisement contents where a bid request is received, advertisement content, determined as an exposure ranking equal to or less than the number of inventories, may not be exposed.

The advertisement content exposing system 102 may expose the advertisement content on the exposure region at a playback time of the digital broadcast content. When the display scene 601 of the digital broadcast content is displayed as illustrated in FIG. 6, the advertisement content for which the bid request is received with respect to the corresponding scene may be exposed. A time when the advertisement content is exposed may vary depending on a bid for each scene or a bid for each advertising time.

Figure 7:
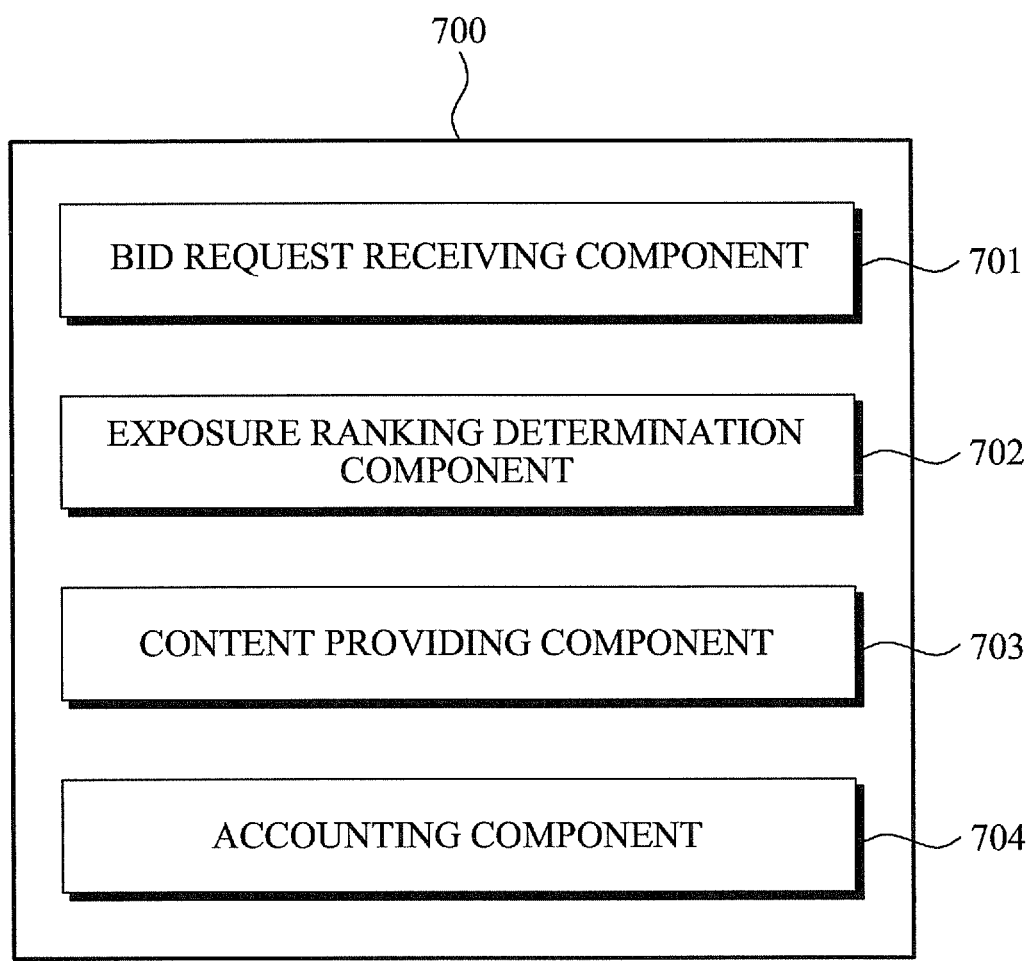
FIG. 7 is a block diagram illustrating a configuration of a computing system for providing advertisement content according to an embodiment of the invention.

FIG. 7 is a block diagram illustrating a configuration of an advertisement content providing system 700 according to an embodiment of the invention.

Referring to FIG. 7, the advertisement content providing system 700 may include a bid request receiving component 701, an exposure ranking determination component 702, a content providing component 703, and an accounting component 704.

The bid request receiving component 701 may receive a bid request with respect to the advertisement content associated with digital broadcast content. In this instance, the advertisement content may be classified by an accounting method. The accounting method may include a CPC method and a CPM method.

For example, the bid request receiving component 701 may receive the bid request with respect to the advertisement content for each scene of the digital broadcast content. Also, the bid request receiving component 701 may receive the bid request with respect to the advertisement content for each predetermined advertising time during a playback time of the digital broadcast content.

The exposure ranking determination component 702 may determine an exposure ranking of the advertisement content using quality information of the advertisement content.

For example, the exposure ranking determination component 702 may determine the exposure ranking using a CTR which is the quality information of the advertisement content regardless of the accounting method.

For example, the exposure ranking determination component 702 may determine the exposure ranking based on the accounting method of the advertisement content. In this instance, when the accounting method of the advertisement content is the CPC method, the exposure ranking determination component 702 may determine the exposure ranking based on a maximum click cost and a ranking index. The maximum click cost may be included in the bid request, and the ranking index may be based on a quality index which is the quality information of the advertisement content.

When the accounting method of the advertisement content is the CPM method, the exposure ranking determination component 702 may determine the exposure ranking based on the CTR of the advertisement content.

In this instance, the quality index may be calculated by applying a weight to each of a quality element of the advertisement content and the CTR of the advertisement content. The quality element may be a pre-evaluation, and the CTR may be a post-evaluation. Here, the quality element may be determined using a popularity of the digital broadcast content or a T&D of the advertisement content.

The quality index may differ depending on advertisement content. When a difference is significant, an accuracy of the determined exposure ranking may decrease. Accordingly, the exposure ranking determination component 702 may determine the exposure ranking using a modified quality index.

For example, the quality index may be modified based on a maximum quality index and a minimum quality index of the advertisement content. Also, the quality index may be modified based on an average value of a quality index of the advertisement content during a predetermined period.

Similarly, a CTR indicating a number of clicks with respect to a number of exposures may rapidly increase at a particular point due to a variety of factors. For example, a range of change in the CTR may vary depending on an event, a season, weather, a current issue, and the like. Accordingly, the exposure ranking determination component 702 may determine the exposure ranking of the advertisement content using the modified CTR.

For example, the CTR may be modified based on an average CTR during a predetermined period for each exposure ranking of the advertisement content. In this instance, a CTR which is significantly different from the average CTR may be removed as an outlier. Also, the CTR may be modified based on an average CTR during a predetermined period.

The content providing component 703 may provide the digital broadcast content and the advertisement content arranged based on the exposure ranking.

The accounting component 704 may receive click information of the advertisement content and perform accounting of the advertisement content based on the accounting method of the advertisement content.

Figure 8:
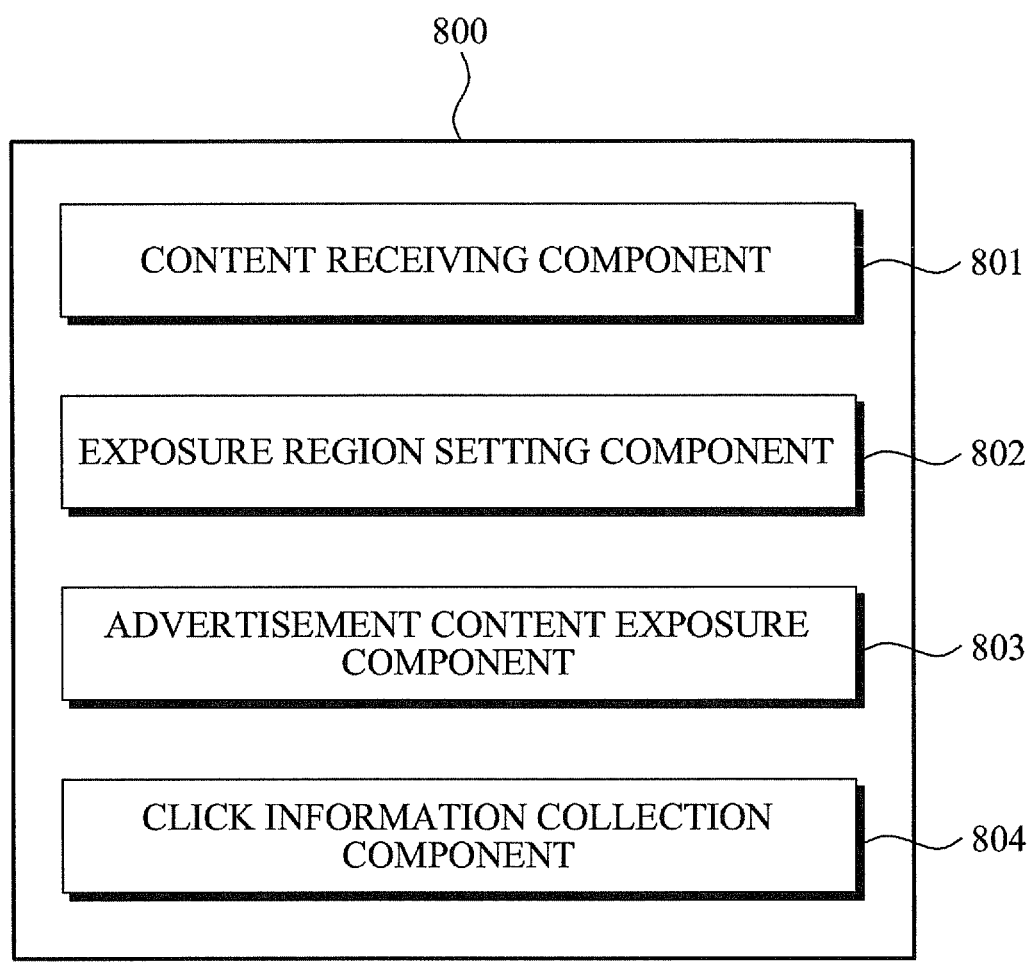
FIG. 8 is a block diagram illustrating a configuration of a computing system for exposing advertisement content according to an embodiment of the invention.

FIG. 8 is a block diagram illustrating a configuration of an advertisement content exposing system 800 according to an embodiment of the invention.

Referring to FIG. 8, the advertisement content exposing system 800 may include a content receiving component 801, an exposure region setting component 802, an advertisement content exposure component 803, and a click information collection component 804.

The content receiving component 801 may receive digital broadcast content and the advertisement content arranged based on an exposure ranking.

In this instance, the advertisement content may be bidden on with respect to each scene of the digital broadcast content. Also, the advertisement content may be bidden on with respect to each predetermined advertising time during the playback time of the digital broadcast content.

For example, the exposure ranking may be determined based on a CTR which is quality information of the advertisement content. That is, the exposure ranking may be determined depending on a value of the CTR regardless of an accounting method of the advertisement content.

Also, the exposure ranking may be determined based on the accounting method of the advertisement content. For example, when the accounting method of the advertisement content is a CPC method, the exposure ranking may be determined based on a maximum click cost and a ranking index. The maximum click cost may be included in the bid request, and the ranking index may be based on a quality index which is quality information of the advertisement content.

Also, when the accounting method of the advertisement content is a CPM method, the exposure ranking may be determined based on the CTR of the advertisement content.

The exposure region setting component 802 may set an exposure region of the advertisement content on a display scene of the digital broadcast content based on the accounting method of the advertisement content.

That is, the exposure region setting component 802 may set the exposure region differently depending on the accounting method of the advertisement content. For example, when the CPC method is used, the exposure region may be set in a top portion or a bottom portion of the display scene of the digital broadcast content. When the CPM method is used, the exposure region may be set in a left portion or a right portion of the display scene of the digital broadcast content.

A setting type of the exposure region may not be limited to the above-described types. The exposure region may be freely set on the display scene of the digital broadcast content.

The advertisement content exposure component 803 may expose the advertisement content on the exposure region at a playback time of the advertisement content.

When the advertisement content is bidden on with respect to each scene of the digital broadcast content, the advertisement content exposure component 803 may expose the advertisement content while the digital broadcast content is replayed.

When the advertisement content is bidden on with respect to each predetermined advertising time during the playback time of the digital broadcast content, the advertisement content exposure component 803 may expose the advertisement content during the advertising time.

The click information collection component 804 may collect and transmit click information of the exposed advertisement content to perform accounting of the advertisement content.

In this instance, the click information may be a number of clicks with respect to the advertisement content based on the CPC method as opposed to the advertisement content based on the CPM method which is managed based on a flat sum payment. The CPC method may be affected by the number of clicks. That is, the click information associated with selecting exposed advertisement content on a display where a digital broadcast is being replayed using a remote control or through a touch screen.

Descriptions which have not been described with reference to FIGS. 7 and 8 may be referred to example embodiments described above with reference to FIGS. 1 through 6, and thus further detailed descriptions will be omitted here.

The method of inspecting the advertisement according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A computer-implemented method of providing digital advertising contents, the method comprising:
   receiving an advertising bid request associated with a broadcast content over a network, the request comprising an advertisement content;
   determining, by a processor, an advertisement exposure ranking based on a click cost using a maximum click cost associated with the advertising bid request and a quality index associated with the broadcast content, wherein the quality information index is determined by a popularity of the broadcast content; and
   providing the advertisement content corresponding to the scene of the broadcast content according to the determination, wherein the advertisement content is arranged based on the exposure ranking.

2. The method of claim 1, wherein relevancy between the advertisement content and the broadcast content is determined according to a scene-by-scene basis of the broadcast content corresponding to the advertisement content.

3. The method of claim 1, wherein the advertising bid request is received according to an advertising time slot during a playback time of the broadcast content.

4. The method of claim 1, wherein a quality index comprises quality information.

5. The method of claim 4, wherein the quality index is calculated by applying a weight to the quality information of the broadcast content based on the popularity and the relevancy.

6. The method of claim 5, wherein the quality information comprises the popularity of the broadcast content, a Title & Description (T&D) of the advertisement content, or both the popularity of broadcast content and the Title & Description (T&D) of the advertisement content.

7. The method of claim 4, wherein the quality index is determined based on an average value of the quality index of the advertisement content during a period.

8. The method of claim 1, wherein the quality index is determined based on an average Click Through Rate (CTR) during a period for each exposure ranking of the advertisement content with respect to the broadcast content or the each scene of the broadcast content.

9. The method of claim 1, further comprising:
receiving click information of the advertisement and calculating account information of the advertisement content based on the click information.

10. A computer-implemented method of exposing advertisement content, the method comprising:
receiving a broadcast content and an advertisement content arranged based on an exposure ranking;
determining, by a processor, an exposure region for the advertisement content based on a maximum click cost associated with the advertising bid request and a quality index associated with the broadcast content, wherein the quality information index is determined by a popularity of the broadcast content or a relevancy between the advertisement content and the broadcast content; and
providing the advertisement content corresponding to each scene of the broadcast content according to the determination.

11. The method of claim 10, wherein the relevancy between the advertisement content and the broadcast content is determined based on a scene-by-scene basis of the broadcast content corresponding to the advertisement content.

12. The method of claim 10, further comprising:
receiving an advertising bid request, wherein an exposure ranking is determined based on the click cost comprising a maximum click cost and a ranking index corresponding to the quality index of the advertisement content.

13. The method of claim 10, further comprising:
classifying a plurality of exposure regions for the advertisement content based on the click cost.

14. The method of claim 12, further comprising:
collecting click information of the advertisement content to determine the maximum click cost.

15. A non-transitory computer-readable storage medium comprising an executable computer program, which when executed, by a processor, performs steps of:
receiving a bid request for an advertisement associated with a broadcast content over a network, the request comprising an advertisement content;
determining, by the processor, an advertisement exposure ranking based on a click cost using a maximum click cost associated with the advertising bid request and a quality index associated with the broadcast content, wherein the quality index is determined by a popularity of the broadcast content or a relevancy between the advertisement content and the broadcast content; and
providing an advertisement content corresponding to each scene of the broadcast content according to the determination, wherein the advertisement content is arranged based on the exposure ranking.

16. A computing system for providing advertisement contents, the computing system comprising:
a processor including a bid request receiving component configured to receive an advertising bid request for an advertisement associated with a broadcast content over a network, the request comprising an advertisement content;
the processor including an exposure ranking determination component configured to determine an advertisement exposure ranking related to broadcast content based on a maximum click cost associated with the advertising bid request and a quality index associated with the broadcast content, wherein the quality index is determined by a popularity of the broadcast content or a relevancy between the advertisement content and the broadcast content; and
the processor including a content providing component configured to provide an advertisement content corresponding to the scene of the broadcast content according to the determination, wherein the advertisement content is arranged based on the exposure ranking.

17. The computing system of claim 16, wherein the bid request receiving component is configured to receive the advertising bid request on a scene-by-scene basis according to the quality index.

18. The computing system of claim 16, wherein the bid request receiving component is configured to receive the advertising bid request associated with a advertising time slot selected during a playback time of the broadcast content.

19. The computing system of claim 16, wherein a ranking index is generated based on the quality index.

20. The computing system of claim 19, wherein the quality index comprises a pre-evaluation and the click cost comprises a post-evaluation.

21. The computing system of claim 20, wherein the quality index comprises the popularity of the broadcast content, a T&D (Title and Description) of the advertisement content, or both the popularity of the broadcast content and the T&D.

22. The computing system of claim 16, wherein the quality index is determined based on a maximum quality index and a minimum quality index corresponding to each scene the advertisement content according to the popularity and the relevancy.

23. The computing system of claim 19, wherein the quality index is determined based on an average value of the quality index of the advertisement content during a period.

24. The computing system of claim 16, wherein the quality index is determined based on an average Click Through Rate (CTR) during a period for the advertisement exposure ranking of the advertisement content.

25. The computing system of claim 16, further comprising:
an accounting component is configured to receive click information of the advertisement content and to perform accounting of the advertisement based on the click cost.

26. A computing system for exposing advertisement content, the computing system comprising:
a processor including a content receiving component configured to receive broadcast content and an advertisement content;
the processor including an exposure region setting component configured to determine an exposure ranking for the advertisement content based on a click cost using a maximum click cost associated with the advertising bid request and a quality index associated with the broadcast content, wherein the quality information index is determined by a popularity of the broadcast content or a relevancy between the advertisement content and the broadcast content; and the processor including an advertisement content exposure component configured to provide the advertisement content for a selected advertising time slot of a playback time of the broadcast content based on the determined exposure ranking.

27. The computing system of claim 26, further comprising:
a bid request receiving component configured to receive an advertising bid request on a scene-by-scene basis.

28. The computing system of claim 26, wherein the exposure region setting component is configured to classify a plurality of exposure regions for advertisement content based on the click cost and the quality index.

29. The computing system of claim 26, further comprising:
a click information collection component configured to collect click information of the advertisement content to determine the click cost.

* * * * *